United States Patent
Bienas et al.

(10) Patent No.: US 9,344,885 B2
(45) Date of Patent: May 17, 2016

(54) COMMUNICATION DEVICES AND CELLULAR WIDE AREA RADIO BASE STATION

(71) Applicant: Intel Mobile Communications GmbH, Neubiberg (DE)

(72) Inventors: Maik Bienas, Braunschweig (DE); Andreas Schmidt, Braunschweig (DE); Martin Hans, Bad Salzdetfurth (DE); Achim Luft, Braunschweig (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 346 days.

(21) Appl. No.: 13/803,241

(22) Filed: Mar. 14, 2013

(65) Prior Publication Data

US 2014/0273954 A1   Sep. 18, 2014

(51) Int. Cl.
*H04W 12/06* (2009.01)
*H04W 12/08* (2009.01)

(52) U.S. Cl.
CPC .............. *H04W 12/06* (2013.01); *H04W 12/08* (2013.01)

(58) Field of Classification Search
CPC .................................................... H04W 12/12
USPC ........................................................ 455/411
See application file for complete search history.

(56) References Cited

U.S. PATENT DOCUMENTS

| | | | |
|---|---|---|---|
| 2005/0153685 A1* | 7/2005 | Choi | 455/411 |
| 2005/0170813 A1* | 8/2005 | Choi | H04W 12/06 455/411 |
| 2007/0077912 A1* | 4/2007 | Mahajan | 455/410 |
| 2010/0151884 A1* | 6/2010 | Chang et al. | 455/456.2 |
| 2010/0184452 A1* | 7/2010 | Choi | 455/456.3 |
| 2010/0210240 A1* | 8/2010 | Mahaffey et al. | 455/411 |
| 2010/0317320 A1* | 12/2010 | Sakargayan | 455/410 |
| 2012/0021715 A1* | 1/2012 | Tiwari | 455/404.1 |
| 2012/0040640 A1* | 2/2012 | Zhou et al. | 455/410 |
| 2012/0172039 A1* | 7/2012 | Ko et al. | 455/435.1 |
| 2012/0178476 A1* | 7/2012 | Ortiz et al. | 455/456.6 |
| 2012/0196571 A1* | 8/2012 | Grkov et al. | 455/411 |
| 2015/0050945 A1* | 2/2015 | Samuel et al. | 455/456.1 |

OTHER PUBLICATIONS

European Patent Office; International Search Report and Written Opinion for PCT/EP2014/051108 mailed May 15, 2014; 9 pages.

* cited by examiner

*Primary Examiner* — Nathan Mitchell
(74) *Attorney, Agent, or Firm* — Schwabe, Williamson & Wyatt, P.C.

(57) ABSTRACT

A communication device may include: a circuit being identified by a unique identifier; a determiner configured to determine as to whether the communication device is unwantedly out of the authorized user's control; a communication connection establisher configured to establish a Subscriber Identity Module less communication connection; and a transmitter configured to transmit a verification state request message including information indicating the unique identifier to another communication device.

6 Claims, 5 Drawing Sheets

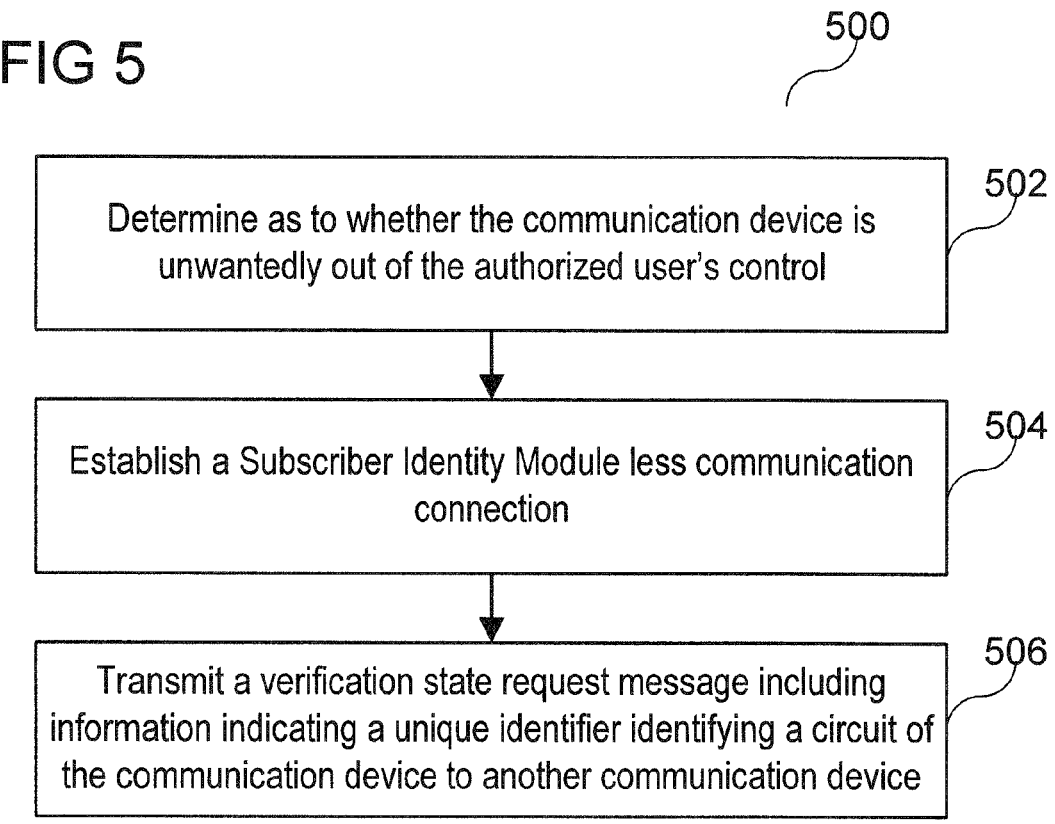
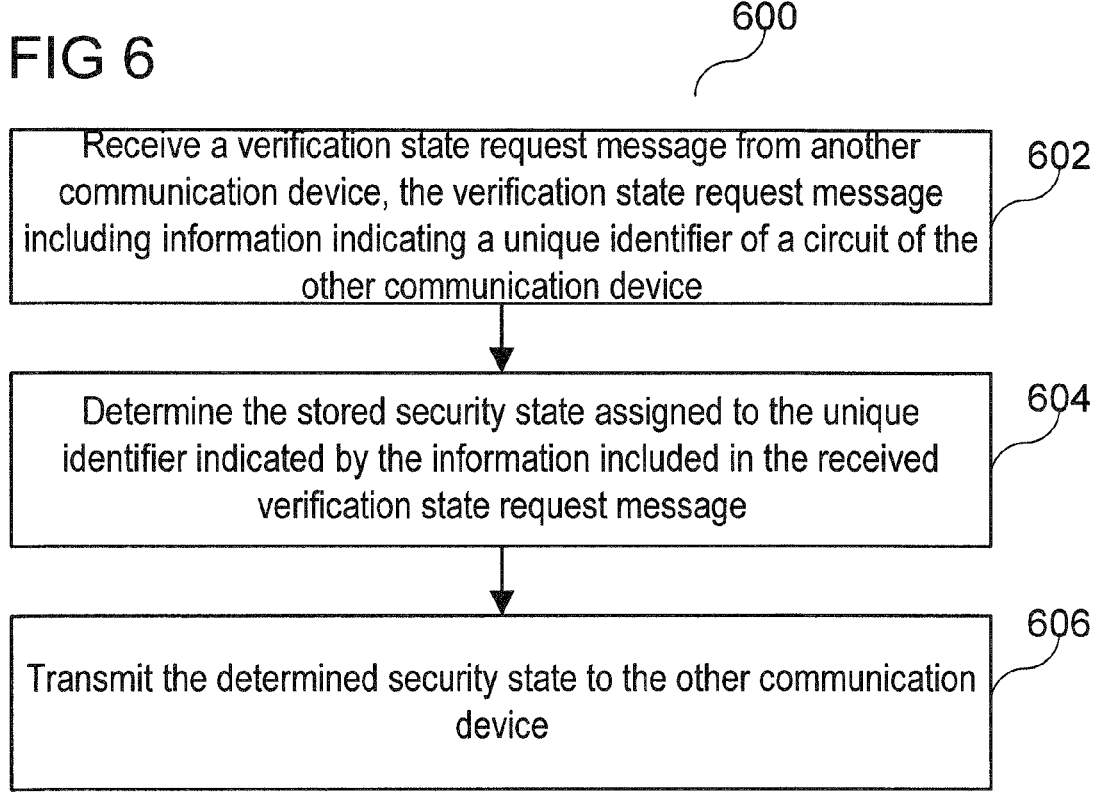

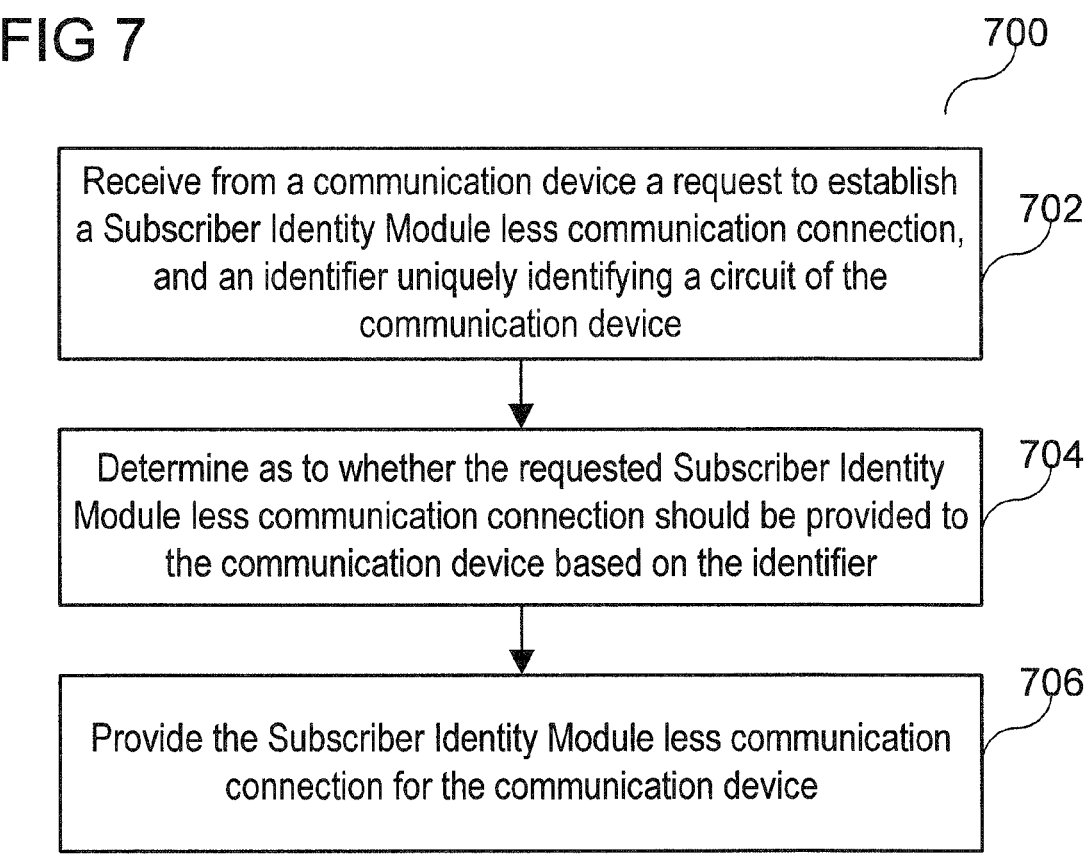

COMMUNICATION DEVICES AND CELLULAR WIDE AREA RADIO BASE STATION

TECHNICAL FIELD

Various aspects of this disclosure relate generally to communication devices and cellular wide area radio base station.

BACKGROUND

Various laptops have a special Anti-Theft functionality. Such devices periodically or sporadically connect to a security server, where the device and the owner are registered. Once the device is lost or stolen, the owner may change the status of the device on a provided security server to "lost/stolen". The next time the device is switched on, it will connect to the security server, will read the new status and the device will be deactivated, so that no one can use it anymore. The device could be made usable again, if the owner changes the status back to "normal" at the security server.

In addition to the "server state based" deactivation, a timer based deactivation is also implemented. This is for the case that the stolen or lost device did not connect to the internet after it was lost or stolen. In this case it will be deactivated automatically if the timer started after last successful connection to the security server expires. This timer is maintained in the device.

In this system, the finder may use the device until expiration of the timer if he succeeds in preventing the device from connecting to the internet. The owner (who will also be referred to as "authorized user") may let the device use his mobile subscription in the device to connect to the internet for such cases, e.g. by permanently disabling the PIN (Personal Identification Number) request in case the cellular modem is activated, but then the finder may easily misuse the subscription and potentially generate high connection fees for the device owner.

The owner could set the timer value very small to limit the time period of misleading use, but this may make the usage by the owner very uncomfortable, e.g. in case he forgets to connect to the internet within this small time period, the device will be locked even for the authorised owner. Therefore, it is very likely that most users will set the timer to the maximum value.

Another conventional feature which is also referred to as "Emergency call" enables a mobile device to perform a voice call to a predefined emergency call centre without requiring a (U)SIM. The device identifier (ID) International Mobile Station Equipment Identity (IMEI) of the cellular modem is used for identification. In this case, no data connection could be established, a security service provider is not able to offer such security service while being charged for the data connection and, instructions by the device owner could not be sent to the device.

Yet another conventional feature which is also referred to as "Ecall" enables a special cellular modem in a car to transmit emergency data in case of an accident to a predefined emergency centre. This service requires a (U)SIM and could not be used to lock the car in case it is lost or stolen.

SUMMARY

A communication device may include: a circuit being identified by a unique identifier; a determiner configured to determine as to whether the communication device is unwantedly out of the authorized user's control; a communication connection establisher configured to establish a Subscriber Identity Module less communication connection; and a transmitter configured to transmit a verification state request message including information indicating the unique identifier to another communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a flow diagram illustrating a method for operating a communication device;

FIG. 6 shows a flow diagram illustrating a method for operating a communication device; and FIG. 7 shows a flow diagram illustrating a method for operating a cellular wide area radio base station.

DESCRIPTION

Figure 1:
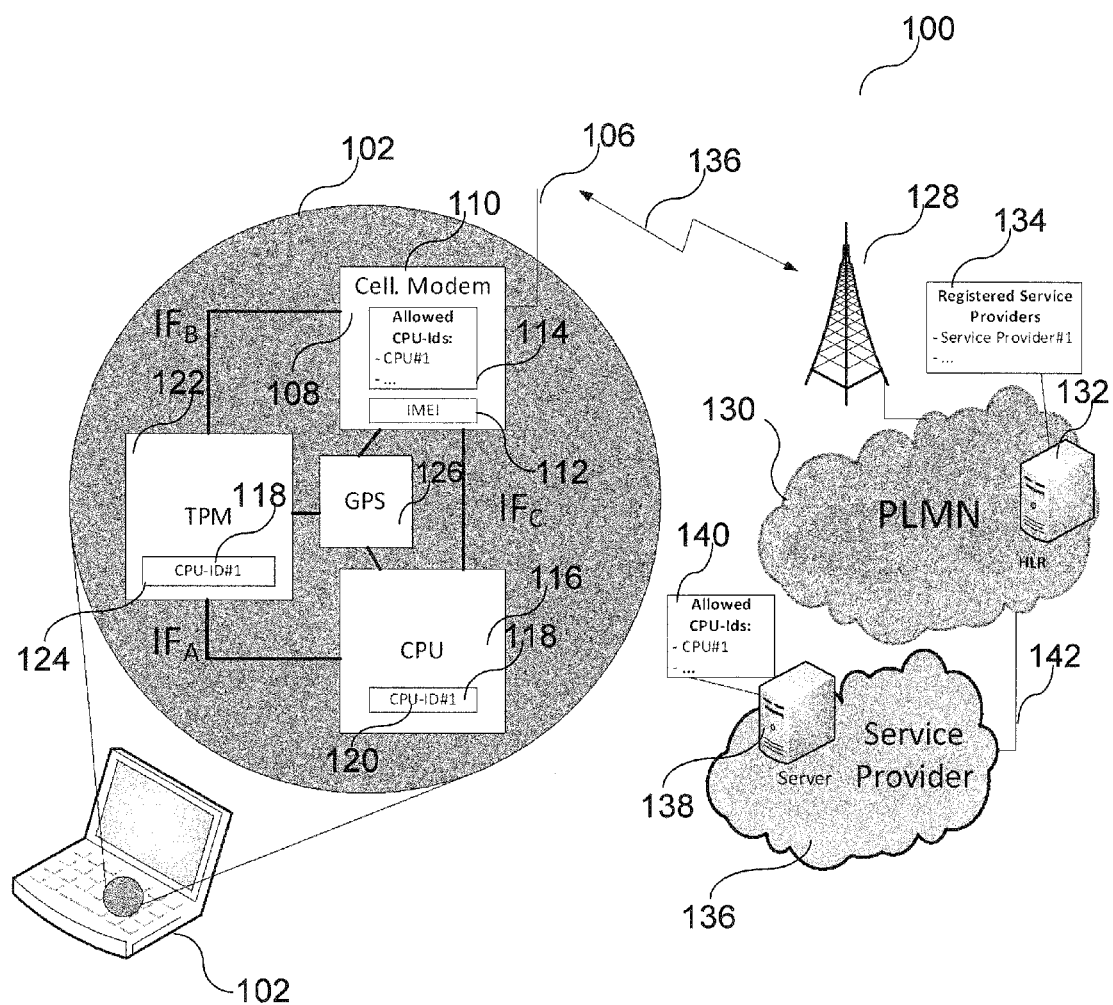
FIG. 1 shows a communication system architecture.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

In the following, a "circuit" may be understood as any kind of a logic implementing entity, which may be hardware, software, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). As will be described in more detail below, a "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit".

The terms "coupling" or "connection" are intended to include a direct "coupling" or direct "connection" as well as an indirect "coupling" or indirect "connection", respectively.

The term "protocol" is intended to include any piece of software, that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

Various aspects of this disclosure provide a third party charged SIM-less data connection.

Various aspects of this disclosure provide mechanisms for how to make a stolen or lost device (in general a device which has unwantedly come out of the authorized user's control) that includes a cellular modem less attractive (unusable) for the unauthorized finder;

how to support the owner of a stolen or lost device (in general a device which has unwantedly come out of the authorized user's control) that includes a cellular modem by finding his device; and how to protect the owners sensible data in case it is lost or stolen (in general which has unwantedly come out of the authorized user's control).

All three above features may be enabled without the need of a SIM (Subscriber Identity Module) or USIM (UMTS (Universal Mobile Telecommunications System) Subscriber Identity Module), so that it works even in case the theft removes the SIM or USIM.

A system may be provided that allows to detect that a device has unwantedly come out of the authorized user's control, e.g. that a device is lost or stolen and to establish a communication connection from the e.g. lost or stolen device to a pre-defined server by using a cellular modem without the need to use an owner's mobile subscription, i.e. without requiring the user's (or anybody else's) SIM or USIM.

As will be described in more detail below, various aspects of this disclosure offers various new functionalities such as:

The communication device automatically detects that it is potentially out of the authorized user's control, e.g. lost or stolen.

Other scenarios in which the communication device is out of the authorized user's control may be seen in a misplacement or displacement of the communication device, an (undesired) destruction of the communication device, an unauthorized activation of the communication device, and the like. In other words, the communication device may be considered to be operated or controlled without the authorized user's consent or permission.

After detection: the communication device (e.g. automatically) establishes a "SIM-less data connection" to a pre-defined server device (e.g. server computer) by using a cellular modem of the communication device without requiring a (U)SIM (i.e., e.g. the lost or stolen device (or the communication device generally being out of the authorized user's control) may be enabled to autonomously initiate a special type of communication connection establishment) in order to obtain owner's (i.e. the communication device owner's) security instructions (e.g. "Lock my communication device. It's lost or stolen."); and/or send the current location of the communication device to track the communication device.

The communication device may take appropriate action(s) after obtaining the communication device owner's security instructions, e.g. it is locked and/or made unusable and/or sensible data may be encrypted.

After the communication device has established the SIM-less data communication connection, it can be forced by the owner of the communication device to stay in idle mode (e.g. in RRC (Radio Resource Control) idle mode) in the cellular mobile radio communication network (i.e. it can be paged by the cellular mobile radio communication network and may perform (e.g. RRC) idle mode procedures like "tracking area updates") to obtain owner's (i.e. the communication device owner's) security instructions; and/or send the current location of the communication device to track the communication device.

For authorisation a unique ID (identifier) is generated by a cryptographic circuit (which may include or be implemented by means of a Trusted Platform Module (TPM) from a unique identifier of a circuit of the communication device (e.g. a CPU-ID (instead of using credential from the (U)SIM) or a memory circuit (e.g. an solid state drive memory) ID or a communication circuit (e.g. a MAC (Medium Access Control)-Address) or a unique identifier of the TPM itself, or any other unique ID of a circuit of the communication device or a combination of two or more hardware- or software-related IDs). The TPM (in general the cryptographic circuit) may store cryptographic keys and may be configured to calculate a temporary CPU-Identity, for example.

A unique ID may be understood as an identifier being unique in the involved communication architecture so that the respective circuit the unique ID is assigned to can be unambiguously identified (e.g. by a security server, as will be described in more detail below). By way of example, the unique ID may be a hexadecimal value consisting of 16 digits, e.g. "BFEBFBFF00012345" assigned to the respective circuit (e.g. already by the manufacturer of the circuit), which cannot (or hardly) be altered by the owner of the communication device.

As will also be described in more detail below, a new type of communication connection may be used which is indicated by the communication device at (e.g. mobile radio) communication connection setup. The communication connection may have the following properties:

No SIM or USIM is needed.

The (e.g. mobile radio) communication connection is only established if certain preconditions are valid, e.g. the loss of the communication device is detected (as will be described later in this specification).

The communication connection is not human-initiated but communication device-initiated.

The communication connection is established only to a certain pre-defined destination, e.g. a pre-defined server or a pre-defined address.

The communication connection may be charged to a third party that offers such anti-theft services, e.g. the party that provides the security server.

The communication connection could be established only in case that some or all following conditions are fulfilled. This may prevent un-allowed usage of the service:

the requesting circuit (e.g. the requesting CPU (central processing unit)) may be registered at the transmitter (e.g. cellular modem) of the communication device. Therefore, it was made known to the transmitter (e.g. cellular modem) by the security server e.g. when the security service was set up, i.e. prior to the first usage of the "SIM-less data connection";

the service provider indicated by the communication device at communication connection set up is registered at the (e.g. mobile radio) cellular network to accept the call fees for the relating connections. The registration may be done prior to the communication connection is established; and/or the requesting circuit (e.g. the requesting CPU) is registered at the security server.

A value that is calculated from the unique ID of the circuit (e.g. CPU) is used to identify the communication device at communication connection setup.

The cellular (e.g. wide area mobile radio) communication network may handle communication connection requests that uses this new communication connection type differently compared to other communication connection requests, i.e. the authentication is illustratively based on a unique circuit ID, e.g. CPU-ID, the communication connection fee may be charged to a third party indicated e.g. in the request and the selection of Quality of Service (QoS)-related parameters can be done based on this type of communication connection.

As outlined above and as will also be described in more detail below, various aspects of this disclosure may provide some or all of the following effects:
- The communication device may automatically detect that it is potentially out of the authorized user's control, e.g. lost or stolen.
- The communication device could be made unusable immediately after detection of lost/theft.
- The communication device could be found easily by using the tracking function.
- The mechanism could not be circumvented by the unauthorized user.
- The sensible data stored in the communication device are not usable by the unauthorized user.
- The communication device could not be used by the unauthorized user.
- To steal such a communication device may be less attractive and therefore, fewer communication devices featured with this kind of mechanism may be stolen.

Some or all effects may be valid even for the case that an unauthorized finder of a e.g. lost or stolen communication device tries to prevent an internet communication connection by switching off e.g. Wireless Local Area Network (WLAN), unplugging the wired Local Area Network (LAN) and removing the owner's SIM card.

Various aspects of this disclosure may enable a communication device-initiated (i.e. not user-initiated) communication connection to a pre-defined server over the cellular network without requiring a SIM or USIM. The communication connection may be
- charged to a third party (service provider) which is also controlling the communication connection;
- used to check the state of the communication device at the security server;
- used to deliver an instruction by the server to the communication device, e.g. a "lock device" instruction or "encrypt sensitive data" instruction if the state indicates that the communication device is lost or stolen;
- used to send the communication device's current location to the security server to easily find the communication device.

Various mechanisms may be provided to avoid unauthorized use of the communication device using the various processes described herein:

1. The circuit (e.g. CPU) of the communication device "owns" a unique ID ("circuit ID", e.g. "CPU-ID") which may be used to authenticate the communication device at different entities:
   a) The circuit ID, e.g. CPU-ID, may be registered at the service provider. A value derived from this circuit ID, e.g. CPU-ID, is used during the communication connection setup procedure for access policy enforcement and may enable the service provider to reject communication connection requests of not registered communication devices.
   b) The cellular communication network can be made aware of allowed circuit IDs, e.g. CPU-IDs, and is therefore enabled to reject communication connection setup attempts from unknown CPU-IDs. The cellular communication network may obtain the circuit IDs, e.g. CPU-IDs, from the service provider prior to a relating communication connection is set up. As an alternative, the cellular communication network may ask the service provider whether the indicated ID (circuit ID, e.g. CPU-ID) is authorized for the service during the communication connection setup procedure. In any case, if it is unknown or forbidden by the service provider, the communication connection setup is rejected.
   c) The cellular modem can be made aware of allowed circuit IDs, e.g. CPU-IDs, by the service provider and is therefore enabled to reject communication connection setup attempts from unknown circuit IDs, e.g. CPU-IDs. The service is set up by the transmitter of the communication device (e.g. cellular modem) only in case an authenticated circuit, e.g. CPU, triggers the request. This may prevent the unauthorized usage of the transmitter, e.g. cellular modem, for SIM-less data connection if the transmitter, e.g. cellular modem, is used in another communication device or with another circuit, e.g. another CPU.

2. The service provider can be registered at the cellular (wide area mobile radio) network to offer such "SIM-less data service" and to accept the call fees for the relating communication connections. Therefore, a relating entry in a Home Location Register (HLR) may be established. This may prevent the unauthorized user to establish a free of charge communication connection to any address the user selects.

3. Instead of transmitting the CPU-ID in plain text at communication connection setup, a unique ID may be created by the cryptographic circuit, e.g. TPM, e.g. by hashing the circuit ID, e.g. CPU-ID, in a first process. The result of this hash procedure may then be digitally signed in a second process and assigned to the circuit, e.g. CPU, in a third process. This ID may be used during the communication connection setup as described in item 1 above. The usage of such an ID may be provided as it prevents that the real circuit ID, e.g. CPU-ID, could be derived and used by unauthorized users.

The processes under items 1 to 3 could be used simultaneously or individually. The protection against misleading use is highest, if all processes are applied.

FIG. 1 shows a communication system 100. The communication system 100 may include one or more (in general an arbitrary number of tens, hundreds, thousands or even more) mobile radio communication terminal devices 102, which will also be referred to as communication terminal devices 102 in the following.

A communication terminal device 102 may be any kind of electronic device which has the capability to provide the communication functionality as described above and as will be described in more detail below. Just to mention a few examples, a communication terminal device 102 may be a mobile phone, a smartphone, a tablet, a netbook, a notebook, a laptop, a (e.g. personal) computer, any kind of multimedia device e.g. including a television set, or even a watch including a respectively suitable circuitry, and the like.

As shown in FIG. 1, the communication terminal device 102 may include a circuit 116 being identified by a unique identifier. The circuit 116 may include or be implemented by a central processing unit (CPU) 116 It is to be mentioned that the circuit may be any kind of hardware (e.g. any kind of hardware logic such as e.g. a hard-wired logic (e.g. one or more Programmable Logic Array (PLA) and/or one or more Field Programmable Gate Arrays (FPGAs)) or programmable logic (e.g. one or more programmable processors, e.g. one or more programmable microprocessors or nanoprocessors), software (any kind of operating system software or operating system software components or application software or application software components), firmware, or any combination thereof, which has assigned a unique ID, as described above.

The communication terminal device 102 may further include one or more antennas 106, a transceiver 108 coupled to the one or more antennas 106, wherein the transceiver 108 may include one or more transmitters and/or one or more receivers. The transceiver 108 (e.g. one or more of the transmitter(s)) may be implemented by means of a cellular modem 110, which may include one or more memories, e.g. a first memory 112 storing the International Mobile Station Equipment Identity (IMEI) of the cellular modem 110, and/or a second memory 114 storing one or more unique IDs assigned to respective circuits of the communication terminal device 102 as described above and as will be described in more detail below. By way of example, the cellular modem 110 may be configured according to GSM (Global System for Mobile Communications), UMTS (Universal Mobile Telecommunications System), LTE (Long Term Evolution) or other cellular wide area radio access technologies.

Moreover, the communication terminal device 102 may include a cellular wide area radio communication technology circuit (which may also be at least partially implemented by the transceiver 108) configured to provide a communication according to a cellular wide area radio communication technology. The cellular wide area radio communication technology may include a Third Generation Partnership Project (3GPP) communication technology such as e.g. UMTS (Universal Mobile Telecommunications System), LTE (Long Term Evolution), LTE-Advance, and the like. It is to be noted that any other cellular wide area radio communication technology may be provided such as e.g. a Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), CDMA2000 (Code division multiple access 2000), CDPD (Cellular Digital Packet Data), Mobitex, HSCSD (High-Speed Circuit-Switched Data), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), TD-CDMA (Time Division-Code Division Multiple Access), TD-CDMA (Time Division-Synchronous Code Division Multiple Access), cdmaOne (2G), CDMA2000 (3G) (Code division multiple access 2000 (Third generation)).

The communication terminal device 102 may further include a circuit 116, wherein the circuit 116 has a unique ID 118 (in the following, the CPU-ID 118 (CPU-ID#1 in FIG. 1) will be used for reasons of simplicity as an example for the unique ID 118) assigned thereto and stored in a memory 120 of the circuit 116. By way of example, the circuit 116 may be a processor, e.g. a central processing unit (CPU) 116 of the communication terminal device 102.

Moreover, the communication terminal device 102 may optionally include a cryptographic circuit 122 configured to provide one or more cryptographic functions, such as e.g. at least one cryptographic function selected from a group of cryptographic functions consisting of:
 a hash function;
 encrypting and/or decrypting (in other words, providing encryption and/or decryption); and
 digital signing (in other words, providing a digital signature).

The cryptographic circuit 122 may be implemented in the form of a Trusted Platform Module (TPM) 122, wherein the CPU-ID 118 may be stored in a memory 124 of the TPM 122. The cryptographic circuit 122 (e.g. the TPM) may be configured to apply the respectively desired cryptographic function to the unique identifier (e.g. the CPU-ID 118) to provide information indicating the unique identifier. Alternatively, information indicating the unique identifier may be provided in plaintext. As a further alternative, the unique identifier itself may be provided (e.g. in plaintext).

Moreover, the communication terminal device 102 may optionally include a location determiner (e.g. a location determination circuit) 126 configured to determine the location of the communication terminal device 102. The location determiner may include or be made of a satellite-based positioning circuit such as e.g. a Global Positioning System (GPS) circuit, a Galileo circuit, and the like. By way of example, any other type of Global Navigation Satellite System (GNSS) circuit may be provided as the location determiner.

The communication terminal device 102 may include a determiner (which may be implemented by the CPU 116 or any other separate circuit not shown in FIG. 1) configured to determine as to whether the communication terminal device 102 is e.g. lost or stolen. Illustratively, the CPU 116 may be enabled (e.g. by using (e.g. requesting or prompting) a PIN (Personal Identification Number) from a user of the communication terminal device 102, by determining an unusual (geographic) location of the communication terminal device 102 (e.g. using the location determiner 126), by determining an unusual operation (e.g. determining unusual operational use of the communication terminal device 102), by determining replaced or additional (suspicious) hardware and/or software (components)) to detect that the communication terminal device 102 is e.g. lost or stolen and to start the establishment of a SIM-less data connection (as an alternative, instead of the CPU-ID 118, a unique ID of any other hardware and/or software (component) in the communication terminal device 102 may be used).

In other words, the determiner may be configured to determine whether the communication device is unwantedly out of the owner's control using at least one of the following:
 identification information identifying the authorized user of the communication device;
 information about the location of the communication device;
 information about the operation of the communication device; and
 information about at least one of hardware and software of the communication device.

Furthermore, the communication terminal device 102 may include a communication connection establisher (which may also be implemented by the CPU 116 or any other separate circuit not shown in FIG. 1) configured to establish a Subscriber Identity Module (SIM) less communication connection.

Moreover, the transmitter may be configured to transmit a verification state request message including information indicating the unique identifier to another communication device (e.g. a server, e.g. a security server), as will be described in more detail below with reference to FIG. 2).

As will also be described in more detail below a receiver of the transceiver 108 may be configured to receive an instruction to enter a pre-defined communication device state. The communication terminal device 102 may be configured to enter the pre-defined communication device state, e.g. a pre-defined security state or locking state of the communication terminal device 102. In other words, a circuit may be provided in the communication terminal device 102 (e.g. also implemented by the CPU 116) configured to cause the communication terminal device 102 to enter the pre-defined communication device state according to the received instruction.

As shown in FIG. 1, the transceiver 108 may be coupled to the CPU 116 via a first interface (e.g. an $IF_C$ interface). Furthermore, the transceiver 108 may be coupled to the cryptographic circuit 122 via a second interface (e.g. an $IF_B$ interface). Moreover, the CPU 116 may also be coupled to the cryptographic circuit 122, e.g. via a third interface (e.g. an $IF_A$ interface). The location determiner 126 may be coupled to the transceiver 108, the CPU 116 as well as to the cryptographic circuit 122.

The communication system 100 may further include one or more base stations (e.g. one or more NodeBs, e.g. one or more eNodeBs) 128 and a core network 130 (e.g. a Public Land Mobile Network (PLMN)), which may e.g. include a Home Location Register (HLR) 132. In general, any number of base stations 128, e.g. tens, hundreds, thousands or even more base stations 128 may be provided in the communication system 100. The HLR 132 has stored registered (security) service providers 134, as will be described in more detail below. The communication terminal device 102 may be coupled to the base station 128 via an air interface, e.g. via a radio access network (RAN), e.g. an UTRAN (UMTS RAN) or any other RAN depending on the respectively provided wide area radio communication technology/technologies.

Furthermore, the communication system 100 may include a service provider 136, which may provide one or more security servers 138, wherein the one or more security servers 138 may have stored allowed IDs (e.g. CPU-IDs) 118 in a respective memory 140. The one or more security servers 138 may be coupled to the core network 130 via a connection 142.

Figure 2:
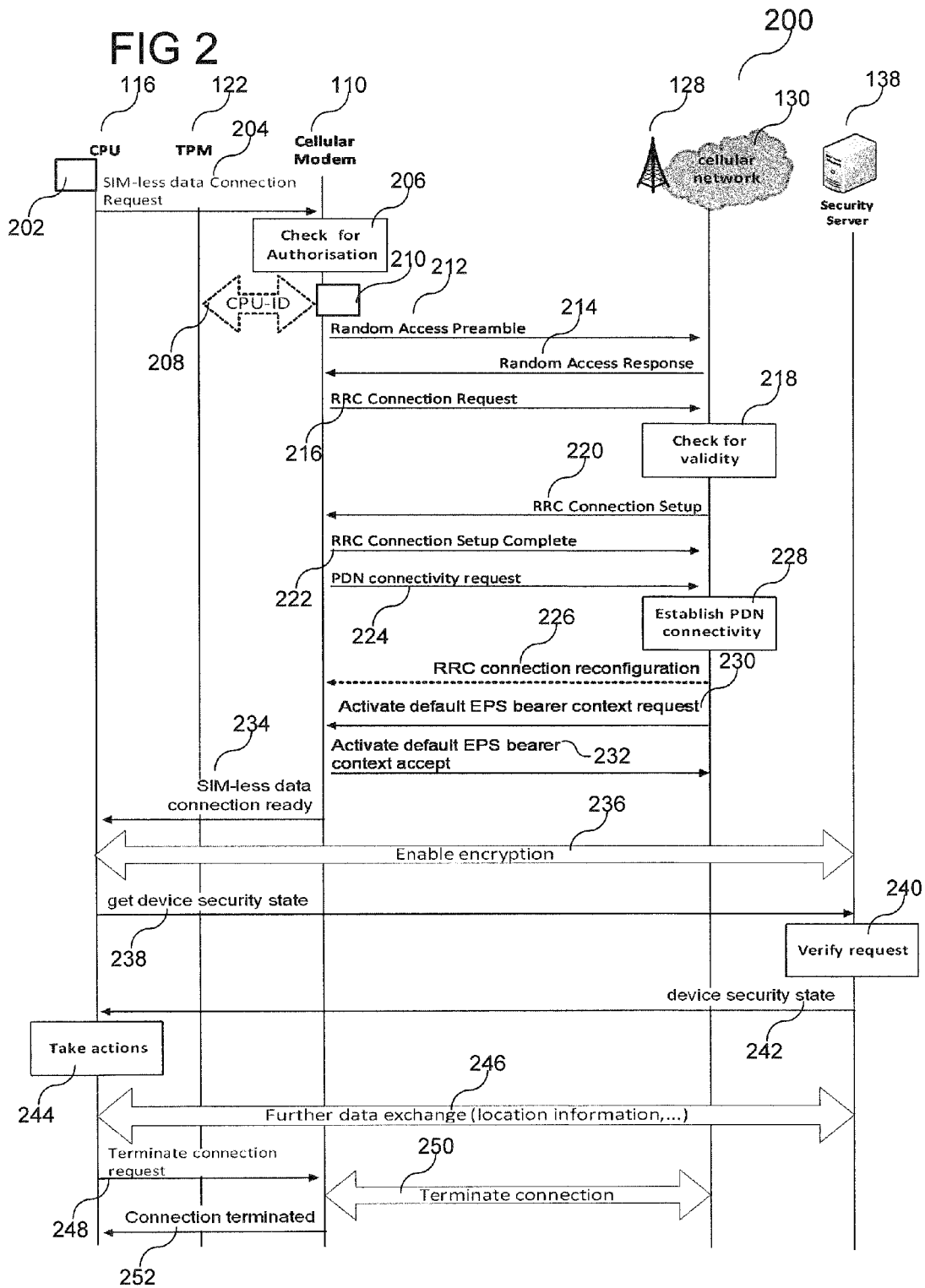
FIG. 2 shows a message flow diagram illustrating a method according to various aspects of this disclosure.

FIG. 2 shows a message flow diagram illustrating a method 200 according to various aspects of this disclosure.

It is to be noted that the operating system of the communication terminal device 102 may or may not be booted when the method 200 is carried out.

In other words, FIG. 2 shows the message flow for the establishment of a SIM-less data connection.

A first process 202 is carried out within the communication terminal device 102, e.g. by the CPU 116. The need to establish a SIM-less data connection may be detected by the CPU 116, e.g. in a manner as described above. Therefore, the CPU 116 may transmit a SIM-less data connection request message 204 to the cellular modem 110 (e.g., via the $IF_C$ interface). The SIM-less data connection request message 204 may includes the CPU-ID 118, optionally the address of the security server 138, optionally the name of the party to be charged for the requested SIM-less data connection and the PLMN 130 to be used for this SIM-less data connection.

A subsequent second process 206 may as well be carried out within the communication terminal device 102, e.g. by the cellular modem 110. The second process 206 may include an authorization check process. In the authorization check process 206, the cellular modem 110 may verify that the received CPU-ID 118 is allowed to use the SIM-less data connection. This may be done by involving the TPM 122 (e.g. via the $IF_B$ interface) and reading relating information from the internal memory (e.g. the second memory 114) of the cellular modem 110 (symbolized in FIG. 2 by means of a double arrow 208). This authorization may prevent misleading use of the cellular modem 110 if it is used in another communication device.

A subsequent third process 210 may as well be carried out within the communication terminal device 102, e.g. by the cellular modem 110. In this third process 210, if the CPU-ID 118 is allowed to use the SIM-less data connection, the cellular modem 110 may optionally request the TPM 122 to generate a unique ID from (in other words based on) the CPU-ID 118 to be used for communication terminal device 102 authorization at the cellular network 130 and at the service provider 136. This may be done e.g. by hashing the CPU-ID 118 with a pre-defined mechanism. Additionally, the result may be digitally signed by the TPM 122. The result may be transmitted back to the cellular modem 110. This CPU-ID 118 derived unique ID may be transmitted over the air instead of transmitting the CPU-ID 118 in plain text. This may prevent misleading use of the CPU-ID 118 by another communication device.

In a subsequent fourth process, the cellular modem 110 may initiate the communication connection set-up procedure to the indicated cellular network 130 by transmission of a random access preamble 212 over the cellular air interface 136.

Then, in a subsequent fifth process, the cellular network 130 may respond to the receipt of the random access preamble 212 with a random access response message 214.

Then, in a sixth process, the cellular modem 110 may generate and transmit an RRCConnectionRequest message 216 to the cellular network 130. A new type of service is requested by the communication terminal device 102, which is indicated to the cellular network 130 during the connection setup. A new "Establishment cause" may be added to the "RRC connection Request message" 216 (e.g. in an added specific message field), which may be referred to as e.g. "3 pc mo-data" (3rd party charged mobile originated data) in an implementation of the RRC connection Request message 216 in ASN.1, as will be described in more detail below. The new service type may include information about the party to be charged and an address of the security server. This information may be included in the RRC connection Request message 216 or in a similar message (even in a separate message which may be provided solely for this purpose). Using this type of service may enable the cellular network 130 to use a different behavior in handling the communication connection setup, i.e. the authentication for such type of service may be based on an ID derived from the (unique) CPU-ID 118, the connection fee may be charged to a third party as indicated in the request message 216 after the validity is checked and the selection of Quality of Service (QoS)-related parameters can be done based on this type of communication connection. Credentials from the SIM or USIM are not required in this case. Encryption of the connection based on credential from the SIM or USIM is therefore not possible. But alternative circuit(s) for encryption might be used, e.g. IPSec. In this case, credentials may be negotiated between the service provider 136 and the CPU 116. As an alternative, the CPU-ID 118 or an associated unique ID calculated upon the CPU-ID 118 may serve as an input parameter to establish the security context.

Then, in a seventh process 218, which may be carried out in the cellular network 130, a validity check may be carried out. The cellular network 130 may check the validity of the requested service, e.g. by asking the HLR 132 as to whether the indicated service provider 136 is registered to offer such a service. Thus, the HLR 132 may be provisioned with this type of information prior to this request. This process 218 may prevent un-allowed usage at an early stage of the communication connection setup procedure.

Then, in an eighth process, which may be carried out in the cellular network 130 and/or the base station 128, if the indicated service provider 136 is registered to offer the requested service, the cellular network 130 establishes the RRC connection e.g. by generating and transmitting an "RRC connection setup" message 220 to the cellular modem 110. Additionally, this successful verification of the registration may trigger the charging of the service on account of the indicated service provider 136, if desired, as an option.

Then, in a ninth process, which may be carried out in the cellular modem 110, communication terminal device 102 may generate and transmit a "RRC connection setup complete" message 222 back to the cellular network 130 and may request to establish a Public Data Network (PDN) connection by generating and transmitting a "PDN connectivity request" message 224.

Furthermore, in a tenth process, which may be carried out by the cellular network 130, it may be provided to re-configure the RRC connection, e.g. in case the initial configuration is not matching the current need for this request. In this case, a "RRC connection reconfiguration" message 226 may be generated and transmitted to the cellular modem 110.

In an eleventh process 228, which may be carried out by the cellular network 130, the cellular network 130 may establish a bearer for the PDN connection based on the received request. Once the bearer is established in the cellular network 130, an "Activate default EPS bearer context request" message 230 may be generated and transmitted to the cellular modem 110 to configure the default EPS bearer. (This message and the following are intended for the so called "Non-Access Stratum" (NAS), whereas the messages of processes four to ten are intended for the "Access Stratum" (AS))

In a twelfth process, the cellular modem 110 may apply the indicated settings and may indicate the readiness of the bearer to the cellular network 130 e.g. by generating and transmitting an "Activate default EPS bearer context accept" message 232 (which is intended for NAS) and a "RRC connection reconfiguration complete" message (intended for AS), if applicable.

Then, in a thirteenth process, the cellular modem 110 may indicate the successful establishment of the SIM-less data connection to the CPU (e.g. via the $IF_C$ Interface), e.g. by generating and sending a SIM-less data connection ready notification 234 to the CPU 116.

Furthermore, in a fourteenth process, a secure communication connection 236 may be established between the security server 136 and the CPU 116, e.g. by using IPSec. The TPM 122 in the communication terminal device 102 may be involved to set up the security context (e.g. via the $IF_A$ interface). It is to be noted that this process is optional.

In a fifteenth process, the cellular modem 110 may generate and transmit a "get device security state" message 238 (intended for NAS) to the security server 136 in order to obtain the user defined communication terminal device state. Included may be the unique ID (which may be either a "CPU-ID" 118 or the unique ID generated in the third process). The unique ID may be conveyed from the communication terminal device 102 to the cellular network 130 as part of the "Get Device Security State" NAS message 238, while, as an alternative, it may also be included in other uplink messages of FIG. 2, such as the "RRC Connection Request" Message 216 of the sixth process (i.e. a message intended for the AS) or a "Activate default EPS bearer context accept" message 232 (intended for NAS).

In a sixteenth process 240, the security server 138 may verify that the CPU 116 is registered for the service, if this was not already performed in the fourteenth process. If the verification is true, the device security state may be read from an internal storage (e.g. memory 140) of the security server 138 and may be transmitted to the CPU 116. The respectively generated and transmitted message 242 (e.g. referred to as device security state message) may be digitally signed by the security server 138.

In a seventeenth process 244, the CPU 116 may read the security state from the received message 242. In this example, it is assumed that the security state was set to e.g. "lost/stolen" (see definition below). This may trigger the CPU 116 to lock the communication terminal device 102. The TPM 122 may be involved (e.g. via the $IF_A$ interface) to verify the digital signature of this command in order to prevent fraud. It is no longer usable by any user until the security state is changed by the owner to "normal".

In an eighteenth process 246, it is assumed that the owner of the communication terminal device 102 wants to know the location of the communication terminal device 102. Therefore, it is assumed that the owner has set the option for the location derivation to "once" at the security server 138 (see definition of security state below). The CPU 116 may request the location determiner 126 (e.g. GNSS-Module) to derive the current location. This location may be transmitted to the security server 138 and stored in the owner's domain. The owner can read the location if he is logged into the security server 138 or the security server 138 may transmit the location to the owners email address.

In a nineteenth process 248, the CPU 116 may trigger the cellular modem 110 to terminate the communication connection 246, because all actions from the security state 138 are taken. This is true in case the location derivation option was set to "none" or "once" and the connectivity option was set to "none". As an alternative, in case the "location derivation" option is set to "periodically" the CPU 116 may instruct the cellular modem 110 to turn off until the period for the next location update expires. Then it may again start the SIM-less data connection setup with the first process. In yet an alternative, in case the "connectivity" option is set to "idle", the CPU 116 may instruct the cellular modem 110 to enter the (RRC) "idle mode", i.e. it is prepared to be paged by the cellular network 130 and therefore also prepared for a new communication connection setup if triggered by the security server 138 or by the owner.

In a twentieth process 250, the cellular modem 110 may terminate the communication connection and may turn off, i.e. is no more active on any interface towards the cellular network 130. This process may further include generating (by the cellular modem 110) and transmitting a connection terminated notification 252 to the CPU 116.

A security state may be understood as a piece of information stored on a computer readable device (e.g. server). It may belong to a certain communication device that owns a CPU (e.g. CPU 116). This CPU (e.g. CPU 116) is uniquely identified by a CPU-ID. The state is set by the owner of the communication device (e.g. communication terminal device 102). The usual state is set to "normal", e.g. while the owner uses his communication device. This state allows normal usage of the communication device (e.g. communication terminal device 102). Once the communication device (e.g. communication terminal device 102) is e.g. lost or stolen, the user may connect to the server (e.g. security server 138) that has stored the security state and change the state to e.g. "lost/stolen". This can be done via any kind of communication device that offers Internet access. The security state can be obtained by the CPU (e.g. CPU 116) of the communication device (e.g. communication terminal device 102) and may trigger certain actions by the CPU (e.g. CPU 116), e.g. to lock the communication device (e.g. communication terminal device 102) if the security state is set to e.g. "lost/stolen". Additionally to the security state, the user may set further options for the security state e.g. "lost/stolen" regarding the derivation of the communication device's location. This option may be set to "none", "once", or "periodically". Further, the user may set an option regarding the connectivity in e.g. lost/stolen state. This may be set to "none" and to "idle". "Idle" means that the transceiver, e.g. the cellular modem (e.g. cellular modem 110) will stay in idle mode in the cellular network (e.g. cellular network 130) after the security state e.g. "lost/stolen" was received. This may enable the user to establish a communication connection to the communication device (e.g. communication terminal device 102) at any time to perform further action at the communication device (e.g. communication terminal device 102), e.g. to take photos from the theft, obtaining important personal documents or data from the communication device (e.g. communication terminal device 102), enable a voice connection to the communication device (e.g. communication terminal device 102) and so on. "None" means, that the transceiver, e.g. the cellular modem (e.g. the cellular modem 110) will terminate the communication connection after the security instructions from the owner are taken.

In the following, a possible ASN.1 (Abstract Syntax Notation 1) implementation of the RRCConnectionRequest message 216 is described. The new values compared to a conventional RRCConnectionRequest message are underlined. The new establishment cause "3 pc-MO-data" may replace the unused value "spare2".

```
-- ASN1START
RRCConnectionRequest ::=           SEQUENCE {
criticalExtensions                   CHOICE {
    rrcConnectionRequest-r8            RRCConnectionRequest-r8-IEs,
    criticalExtensionsFuture           SEQUENCE { }
}
}
RRCConnectionRequest-r8-IEs ::=    SEQUENCE {
ue-Identity                          InitialUE-Identity,
establishmentCause                   EstablishmentCause,
spare                                BIT STRING (SIZE (1))
}
InitialUE-Identity ::=             CHOICE {
s-TMSI                               S-TMSI,
randomValue                          BIT STRING (SIZE (40))
CPU-derived-ID                       CPU-derived ID
}
EstablishmentCause                 ENUMERATED {
::=                                  3pc mo-data, emergency,
                                     highPriorityAccess,
                                     mt-Access, mo-Signalling, mo-Data,
                                     delayTolerantAccess-v1020,spare2, ,
                                     spare1}
-- ASN1STOP
```

With respect to the detection of the need for a SIM-less data connection establishment, the following should be noted:

A SIM-less data connection may be established only, if no other way to connect to the Internet is possible and one or more of the following conditions are met:
  After a certain number of login failures (wrong password).
  After removal of SIM.
  After changing hardware (HDD (hard disk drive), . . . ).
  After booting from another device (DVD, USB, . . . ).
  After being switched on at a foreign location.

It should be noted that the SIM-less data connection to the security server may not lock the communication terminal device immediately in any case, e.g. if the owner enters wrong password accidently. Only in case the owner has set the security status on the anti-theft server to e.g. "Lost/stolen" the communication terminal device is locked.

In any case an ordinary Internet connection may be established (e.g. by using WLAN, LAN, Bluetooth, cellular network, . . . ), it is recommended to use this for anti-theft signaling instead of the SIM-less data connection.

The teachings of various aspects of this disclosure may also be used for scenarios different to the ones described above. If the security state definitions are enhanced accordingly, the method may also be used to remotely shut down devices if the user of a communication device has not paid the fee for using it (e.g., in case of hire-purchase and alike).

Further the teachings of various aspects of this disclosure may also be used for different kind of communication devices than a laptop, e.g. for cars, boats, airplanes or other vehicles, for mobile phones or any other device that uses e.g. a CPU and that is worth to be protected against misleading use.

Figure 3:
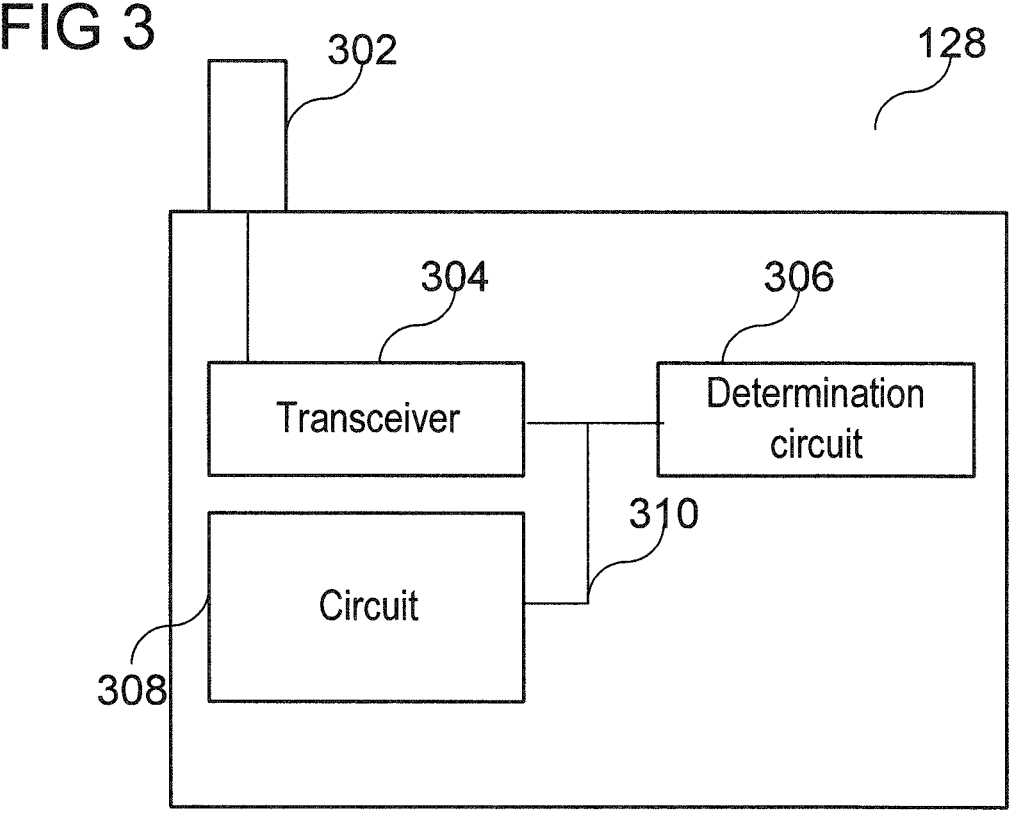
FIG. 3 shows a base station.

FIG. 3 shows a base station 128, e.g. a cellular wide area radio base station 128.

In order to implement the above described functions and process in the base station 128, the bases station 128 may have a structure of a cellular wide area radio base station 128 as shown in FIG. 3. As shown in FIG. 3, the cellular wide area radio base station 128 may include one or more antennas 302 and a transceiver 304, wherein the transceiver may include a transmitter and a receiver configured to receive from a communication device a request to establish a Subscriber Identity Module less communication connection, and an identifier uniquely identifying a circuit (e.g the CPU 116) of the communication device (e.g. the communication terminal device 102). Furthermore, the base station 128 may include a determiner (e.g. a determination circuit 306) configured to determine as to whether the requested Subscriber Identity Module less communication connection should be provided to the communication device based on the identifier. Moreover, the base station 128 may include a circuit 308 configured to provide the Subscriber Identity Module less communication connection for the communication device.

The receiver may further be configured to further receive an address of a server providing a security service to the communication device. The determination circuit 306 may further be configured to determine as to whether the requested Subscriber Identity Module less communication connection should be provided to the communication device based on the address of the server.

The cellular wide area radio base station may be configured according to a Third Generation Partnership Project radio communication technology such as described above.

Furthermore, it may include a cellular wide area radio communication technology circuit (not shown in FIG. 3) configured to provide a communication according to a cellular wide area radio communication technology. Furthermore, a controller may be provided configured to establish a cellular wide area radio communication connection with the communication terminal device 102.

The transceiver 304, the determination circuit 306, the circuit 308, and, if applicable, the cellular wide area radio communication technology circuit may be coupled with each other, e.g. via one or more lines 310, e.g. one or more bus lines 310. Furthermore, a controller may be provided which may implement some or all of the functions provided in the context of the processes as has been described above. Furthermore, one or more of the following circuits may also be implemented by the controller: the transceiver 304, the determiner 306, the circuit 308, and, if applicable, the cellular wide area radio communication technology circuit.

Figure 4:
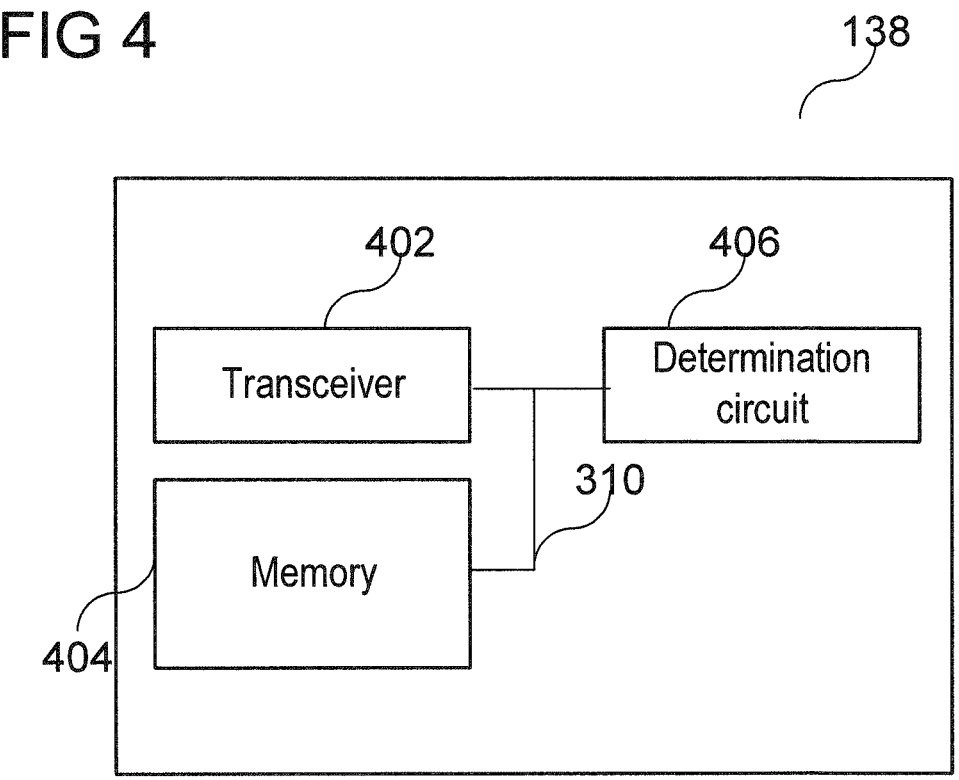
FIG. 4 shows a security server.

FIG. 4 shows a security server 138. The security server 138 may include a transceiver 402, wherein the transceiver 402 may include a transmitter and a receiver configured to receive a verification state request message (e.g. the "get device security state" message 238) from another communication device (e.g. the communication terminal device 102), e.g. via the base station 128. The verification state request message may include the information indicating a unique identifier of a circuit of the other communication device. The security server 138 may further include a memory 404 storing a plurality of respectively unique identifiers, each identifier uniquely identifying a circuit, wherein a security state may be assigned to each stored unique identifier. Furthermore, a determiner (e.g. a determination circuit 406) may be provided which may be configured to determine the stored security state assigned to the unique identifier indicated by the information included in the received verification state request message (e.g. the "get device security state" message 238). The transceiver 402 may include the transmitter configured to transmit the determined security state to the other communication device (e.g. the communication terminal device 102), e.g. via the base station 128. As described above, the security state may be configurable by a user (in other words, user settable). Furthermore, the security server 138 may include a cryptographic circuit configured to provide a cryptographic function; wherein the cryptographic circuit is configured to apply the cryptographic function to the determined security state. The cryptographic circuit may be configured to provide at least one cryptographic function selected from a group of cryptographic functions consisting of: hash function; encryption; and digital signing. The cryptographic circuit may further be configured to provide a digital signature to the determined security state.

At least one of the receiver and transmitter may be configured according to a cellular wide area radio communication technology. At least one of the receiver and the transmitter may be configured according to a Third Generation Partnership Project radio communication technology.

Moreover, the security server 138 may include a location requester configured to request the location of the other communication device (e.g. the communication terminal device 102).

FIG. 5 shows a flow diagram illustrating a method 500 for operating a communication device. The method (which may be carried out by the communication device 102, for example) may include, in 502, determining as to whether the communication device (e.g. communication device 102) is unwantedly out of the authorized user's control. The method may further include, in 504, establishing a Subscriber Identity Module less communication connection, and, in 506, transmitting a verification state request message including information indicating a unique identifier identifying a circuit of the communication device to another communication device.

FIG. 6 shows a flow diagram illustrating a method 600 for operating a communication device. The method (which may be carried out by the security server 138, wherein the security server 138 may include a memory storing a plurality of respectively unique identifiers, each identifier uniquely identifying a circuit, wherein a security state is assigned to each stored unique identifier) may include, in 602, receiving a verification state request message from another communication device, the verification state request message including information indicating a unique identifier of a circuit of the other communication device. The method may further include, in 604, determining the stored security state assigned to the unique identifier indicated by the information included in the received verification state request message, and, in 606, transmitting the determined security state to the other communication device.

FIG. 7 shows a flow diagram illustrating a method 700 for operating a cellular wide area radio base station. The method (which may be carried out by the base station 128, for example), may include, in 702, receiving from a communication device a request to establish a Subscriber Identity Module less communication connection, and an identifier uniquely identifying a circuit of the communication device. The method may further include, in 704, determining as to whether the requested Subscriber Identity Module less communication connection should be provided to the communication device based on the identifier, and, in 706, providing the Subscriber Identity Module less communication connection for the communication device.

Another application of the above described aspects may be seen in a communication device specific IT (information and telecommunication) support.

Moreover, in the cellular wide area radio base station, the receiver may further be configured to further receive a name of a service provider providing a security service to the communication device; wherein the determiner may further be configured to determine as to whether the requested Subscriber Identity Module less communication connection should be provided to the communication device based on the name of the service provider.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A cellular wide area radio base station, comprising:
   a receiver to receive from a communication device a request to establish a Subscriber Identity Module (SIM-)less data connection according to a cellular wide area radio communication technology to facilitate communication of security instructions and verification state request and response messages, and an identifier uniquely identifying a central processing unit (CPU) of the communication device;
   a determiner to determine whether the requested SIM-less data connection should be provided to the communication device based on the identifier; and
   a circuit to provide the SIM-less data connection for the communication device.

2. The cellular wide area radio base station of claim 1, wherein the receiver is further to further receive an address of a server providing a security service to the communication device;
   wherein the determiner is further to determine whether the requested SIM-less data connection should be provided to the communication device based on the address of the server.

3. The cellular wide area radio base station of claim 1, wherein the receiver is further to further receive a name of a service provider providing a security service to the communication device; wherein the determiner is further to determine whether the requested SIM-less data connection should be provided to the communication device based on the name of the service provider.

4. One or more non-transitory, computer readable media having instructions that, when executed, cause a cellular wide area radio base station to:
   receive from a communication device a request to establish a Subscriber Identity Module (SIM-)less data connection according to a cellular wide area radio communication technology to facilitate communication of security instructions and verification state request and response messages, and an identifier uniquely identifying a central processing unit (CPU) of the communication device;
   determine whether the requested SIM-less data connection should be provided to the communication device based on the identifier; and
   provide the SIM-less data connection for the communication device.

5. The one or more non-transitory, computer readable media of claim 4, wherein the instructions, when executed, further cause the cellular wide area radio base station to:
- receive an address of a server providing a security service to the communication device; and
- determine whether the requested SIM-less data connection should be provided to the communication device based on the address of the server.

6. The one or more non-transitory, computer readable media of claim 4, wherein the instructions, when executed, further cause the cellular wide area radio base station to:
- receive a name of a service provider providing a security service to the communication device; and
- determine whether the requested SIM-less data connection should be provided to the communication device based on the name of the service provider.

* * * * *